(12) United States Patent
Dewees

(10) Patent No.: US 7,043,342 B1
(45) Date of Patent: May 9, 2006

(54) VEHICLE TRACKING DRIVER ASSISTANCE SYSTEM

(76) Inventor: Thomas Gerret Dewees, 1748 Beechwood Way, Pleasanton, CA (US) 94566

( * ) Notice: Subject to any disclaimer, the term of this patent is extended or adjusted under 35 U.S.C. 154(b) by 386 days.

(21) Appl. No.: 10/705,361

(22) Filed: Nov. 10, 2003

(51) Int. Cl.
    G08B 5/00 (2006.01)
(52) U.S. Cl. .............................. 701/1; 33/264; 33/286; 116/28 R
(58) Field of Classification Search .................. 33/264, 33/231, 232, 274, 276, 737; 434/1, 62; 116/31; 701/23
See application file for complete search history.

(56) References Cited

U.S. PATENT DOCUMENTS

| 1,429,166 | A |   | 12/1922 | Rommer |  |
|---|---|---|---|---|---|
| 1,610,477 | A |   | 12/1926 | Sanford |  |
| 2,584,777 | A | * | 2/1952 | Adolfson | 33/264 |
| 3,199,487 | A | * | 8/1965 | Heinkel | 116/28 R |
| 3,834,036 | A | * | 9/1974 | Scarritt, Sr. | 33/264 |
| 4,016,653 | A |   | 4/1977 | Bartlett |  |
| 4,079,519 | A |   | 3/1978 | Carmouche |  |
| 5,052,113 | A |   | 10/1991 | Aquino |  |
| 6,142,013 | A | * | 11/2000 | Gray | 73/178 R |
| 6,345,586 | B1 |   | 2/2002 | Okada |  |
| 6,429,789 | B1 | * | 8/2002 | Kiridena et al. | 340/905 |
| 6,499,869 | B1 | * | 12/2002 | Southworth | 362/504 |
| 6,641,289 | B1 | * | 11/2003 | Kadesh | 362/487 |
| 2002/0174822 | A1 | * | 11/2002 | Royal | 116/28 R |
| 2003/0019117 | A1 | * | 1/2003 | Hoholik | 33/264 |

* cited by examiner

Primary Examiner—Thomas G. Black
Assistant Examiner—Christine M. Behncke
(74) Attorney, Agent, or Firm—Thomas M. Freiburger

(57) ABSTRACT

A system of vehicle tracking assists the driver of the subject vehicle (especially if it is a wide vehicle such as a motorhome or large truck) to determine the exact position of the subject vehicle and the width and location of the safe clearance path of the vehicle as it moves forward. This system incorporates hardware, setup instruction and means to train the driver to change and improve the accuracy of his or her perception of the path the vehicle will travel and warn the driver of what may lie within that path. This system takes into account that the driver generally has two eyes and enables the driver to keep them both focused on the road ahead of the vehicle while enabling him or her to continuously identify the limits of the safe clearance path of the vehicle.

22 Claims, 12 Drawing Sheets

View from above

VEHICLE TRACKING DRIVER ASSISTANCE SYSTEM

BACKGROUND OF THE INVENTION

The present invention relates to a system of vehicle tracking which will assist the driver of the subject vehicle, especially if it is a wide vehicle such as a motorhome or large truck. This system incorporates hardware, setup instructions and means to train the driver to change and improve the accuracy of his or her perception of the path the vehicle will travel and warn the driver of what may lie within that path.

All drivers of motor vehicles other than motorcycles experience a certain degree of uncertainty about exactly how far the passenger side of their vehicle will be from objects on that side of the road as they pass by them. With experience their margin of uncertainty and/or error decreases. In the case of wide vehicles such as trucks or motorhomes, the inability to judge this distance in advance can lead to disaster or at the very least extreme nervousness even for an experienced driver. To some lesser degree this same problem occurs with the driver's side. In many other large vehicles, knowing exactly where the sides of the vehicle are can also be a problem for the driver.

The prior art includes a large number of feeler fingers and vertical rods designed to be fastened to bumpers and fenders. They were designed to let the driver know when the vehicle struck or was about to strike something but were not much help in warning the operator of danger before it happened. Also in the art are a number of sighting devices that are either on the hood or fenders of the car (see for example Carmouche, U.S. Pat. No. 4,079,519, Scarritt, Sr., U.S. Pat. No. 3,834,036 and Sanford, U.S. Pat. No. 1,610,477) or are located at the bottom of the windshield (see for example Okada, U.S. Pat. No. 6,345,586 B1) or on the dashboard surface (see for example Aquino, U.S. Pat. No. 5,052,113). They are designed to locate lane lines, center lines or pavement edges close to the vehicle where they disappear from the driver's view beneath the vehicle. Again, at normal highway speeds, this close-in warning is often not in time to avoid danger and it tends to take the driver's attention off the road ahead. Another group of devices in the state of the art include various "arms" (see for example Rommer, U.S. Pat. No. 1,429,166 and Adolfson, U.S. Pat. No. 2,584,777) and wires or rods (see for example Heinkel, U.S. Pat. No. 3,199,487) or sighting devices (see for example Bartlett, U.S. Pat. No. 4,016,653) mounted between the driver and the vehicle windshield. These too are to be used by the driver to locate the vehicle position relative to lane lines, center lines or pavement edges with the advantage over the previous groups that they could be used to judge this position farther ahead of the vehicle.

All of the prior art devices require the driver to remove his or her attention from the road ahead to focus on a particular sighting device. None take into account that, since the driver has two eyes, when he or she focuses and converges on a device near the windshield area, the road ahead will necessarily be out of focus and convergence.

SUMMARY OF THE INVENTION

In its several embodiments, this invention is a system which includes both the device and means to change the way the driver perceives the relationship of his or her vehicle to the road ahead and possible obstructions. This system takes into account that the driver generally has two functional eyes which should, for safety and effectiveness reasons, be kept focused on the road ahead of the vehicle. In the present invention the specific embodiment of the device part of the invention is not as critical to the function of the invention as is the relationship between the device and the driver's perception generated by the device as a result of the method of setup and the instructions given to the driver in the informational part of the present invention. The device in the present invention embodies a means of providing two lines in, on or near the windshield of the vehicle which are oriented in an upwardly converging alignment. The exact location of these two lines will be such that a specific driver in a specific vehicle, seated in his or her specific customary driving position, with the left eye only (right eye covered or closed) would observe the left-hand line exactly overlaying a real or imagined left-hand side safe clearance line on the driving surface ahead as the vehicle travels straight ahead and with the right eye only (left eye covered or closed) would observe the right-hand line exactly overlaying a real or imagined right-hand side safe clearance line on the driving surface ahead as the vehicle travels straight ahead in a correct position on the roadway.

The present invention includes the method of setting up the position of the lines in a particular vehicle for a particular driver.

The informational part of the present invention teaches the driver to keep his or her attention and eyes focused on the road ahead while driving forward. With his or her eyes focused and converged on the road ahead, the lines in, on or near the windshield will appear to the driver as two pairs of lines slightly out of focus.

The informational part of the present invention teaches the driver to accept the area of the road surface ahead that appears between the innermost lines of the pairs of lines perceived by the driver as the path that must be kept clear of interference with the forward progress of the vehicle he or she is driving. The appearance of an object, lane line or road edge or another vehicle within this area warns the driver that a change of course or other action is necessary to avoid colliding with it.

In its simplest embodiment, the device part of this invention involves the placement of either a straight line or straight line of marks directly on the windshield or a straight line or straight line of marks on a piece of transparent material, which is, in turn, applied to the windshield to indicate to the driver where each side of the vehicle will pass over the road ahead if it continues on a straight course. In practice, although not themselves lighted at night, these lines show up silhouetted against the area of the road ahead lighted by the headlights for night driving.

In still another embodiment of this invention the device part uses light sources such as LEDs or a lighted liquid crystal panel. Placed in the vicinity of the top of the dashboard, these lights would reflect either solid lines of light or interrupted lines of light off the inside of the windshield creating the effect of virtual lines on the windshield to achieve the same result as the previous embodiment. A means is provided to hide the light sources on or near the top of the dashboard from direct observation by the driver when he or she is in a normal driving position behind the wheel. This embodiment has the advantage over the previous embodiment of somewhat better night visibility.

Another form of this embodiment would employ an optical projection of an image of two lines of light or light line segments or lines of light marks onto the windshield.

Another form of this embodiment would provide such visible lines of light images within the windshield structure itself.

An additional improvement to this embodiment is a means by which the driver can adjust and change the position of the lines or lines of marks by remote control while sitting in his or her normal driving position and posture behind the steering wheel. Various state of the art electrical and/or electronic and/or mechanical means of facilitating remote control by the driver can be employed to achieve this embodiment. The normal position of the driver's eyes, relative to the vehicle, is critical to the accuracy of the information about the relationship between the clearance path of the sides of the vehicle and objects in the road ahead provided by the lines or lines of marks on or near the windshield. This improvement constitutes an important addition to the invention since it permits the driver easily to position the lines and adjust them if necessary as taught by the informational part of the invention while seated in a normal driving position and posture.

An additional improvement to the previous embodiment will be a method of assigning definitive values to the parameters by which the subject lines or lines of marks are remotely positioned. By this means the correct location of said lines or lines of marks could be reestablished using the definitive values for a particular driver. This in turn will allow a number of different drivers of the same vehicle equipped with the subject invention to reset the definitive values to suit their particular normal driving position and posture. The setting of the correct values for a particular driver could be done either manually or automatically. The automatic embodiment of this improvement of the invention could easily be adapted to the current state of the art automatic systems currently available in some vehicles. These systems set up a number of conditions desired by a particular driver as a result of the entry of a single code number driver identification into the vehicle control system.

A more sophisticated embodiment of this invention provides the driver with a set of lines, a series of lines or lines of marks for each side of the vehicle that curve in response to the position of the steering wheel showing the driver the clearance path the vehicle will take if the current setting of the steering wheel is held constant and warn of any obstructions within this path. The radius of curvature, vehicle speed, tire slippage, etc. will be calculated by an on board computer which will instantaneously modify the indication seen by the driver as the steering wheel setting changes. For large vehicles the extra clearance required by the track taken by the back end of a long vehicle can also be calculated and shown to the driver by the computer. This is a very important advantage of this embodiment of the present invention because it helps the driver of the subject vehicle avoid hitting objects or curbs that are on the inside of his or her turn.

Another form of this embodiment would provide such curved visible lines as light images within the windshield structure itself.

DESCRIPTION OF PREFERRED EMBODIMENTS

The present invention embodies a system of vehicle tracking which will assist the driver of the subject vehicle, especially if it is a wide vehicle such as a motorhome or large truck. This system incorporates devices, setup instructions and means to train the driver to change and improve the accuracy of his or her perception of the path the vehicle will travel and what may lie within that path.

Figure 2:
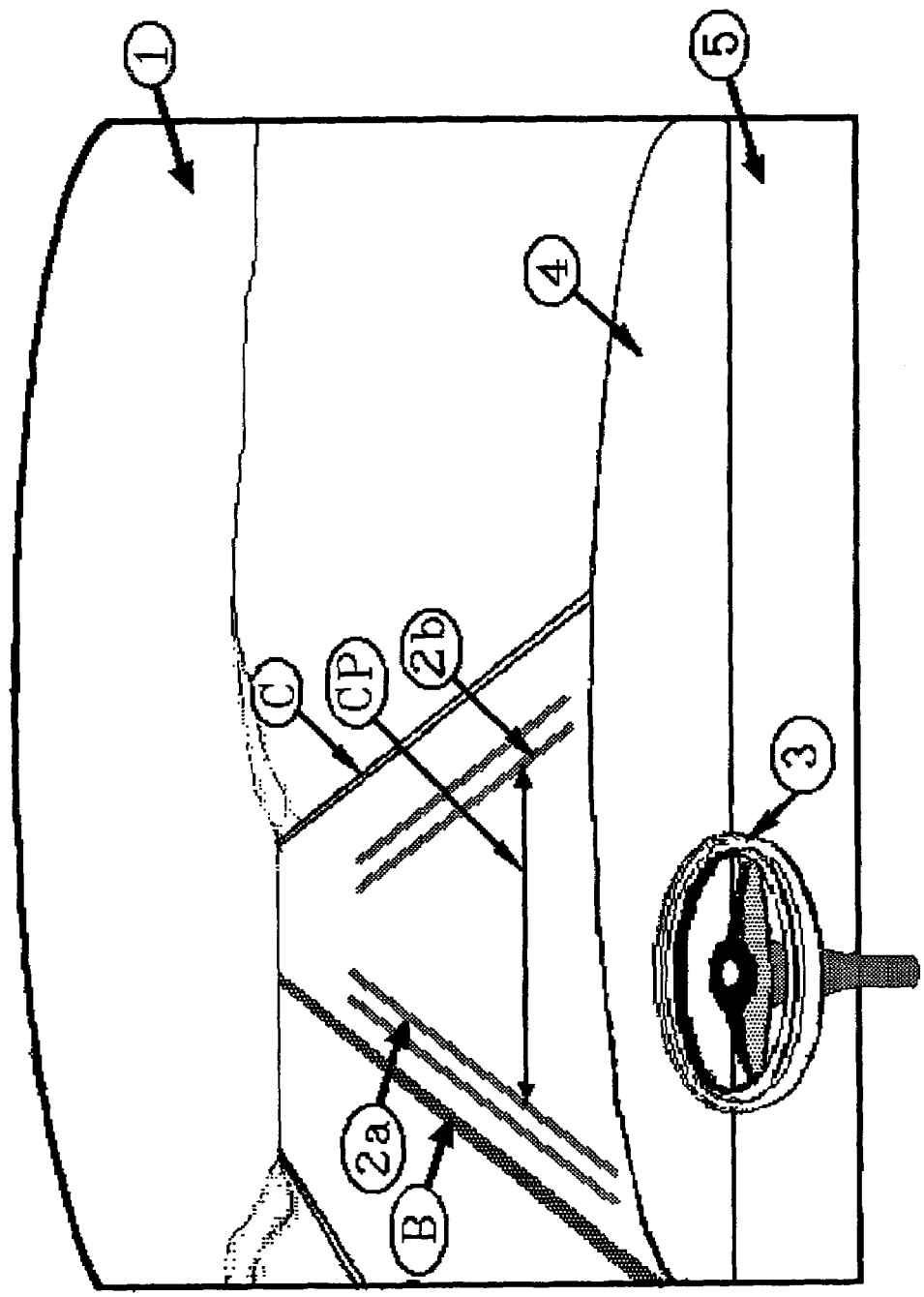
FIG. 2 is the same driver's eye view except that this view shows what the driver will observe if he or she focuses on the road ahead not on the lines on the windshield.
Figure 5:
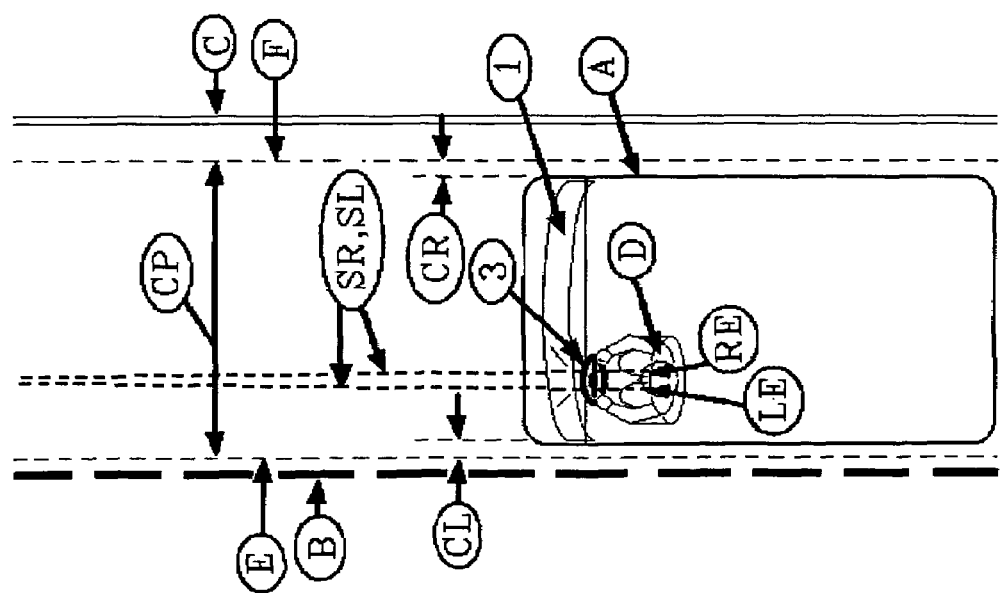
FIG. 5 is a view from above of the subject vehicle showing the driver in his or her normal driving position and showing the driver's lines of sight.

In all of its several embodiments, this invention is a system which includes the device and the means used to train the driver and enhance the driver's perception. As shown in FIG. 2 and FIG. 5, this system takes into account that the driver generally has two functional eyes LE and RE which should, for safety and effectiveness reasons, be kept focused on the road ahead of the vehicle.

Figure 1:
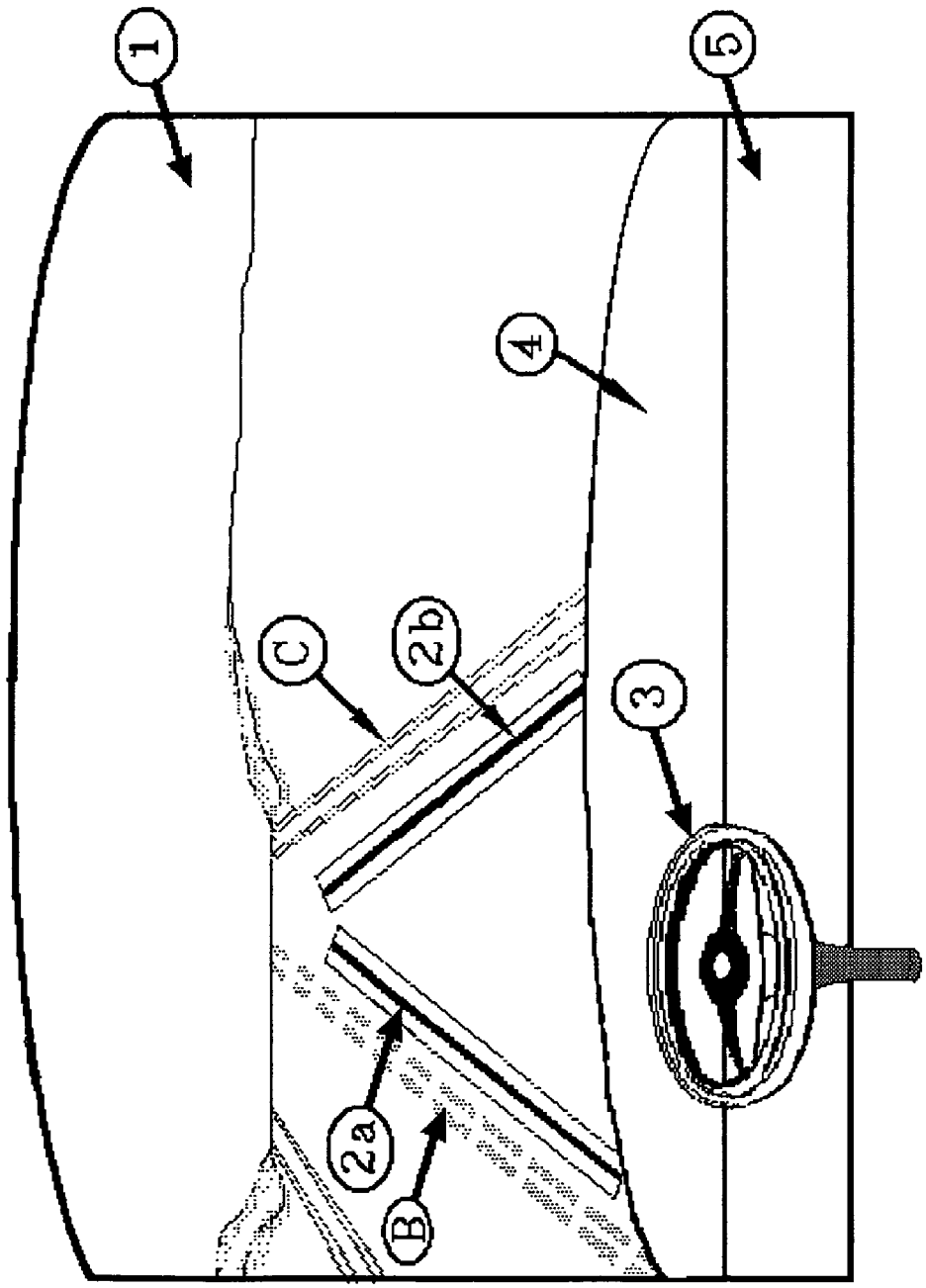
FIG. 1 is a driver's eye view through the windshield of a vehicle equipped with the present invention in the form of two pieces of clear plastic containing two straight lines placed on the inside of the windshield using the setup procedure prescribed in the informational part of the present invention. In this drawing the view shown is as observed by the driver focusing his eyes on the lines on the windshield not on the road ahead as taught in the informational part of the present invention.
Figure 3:
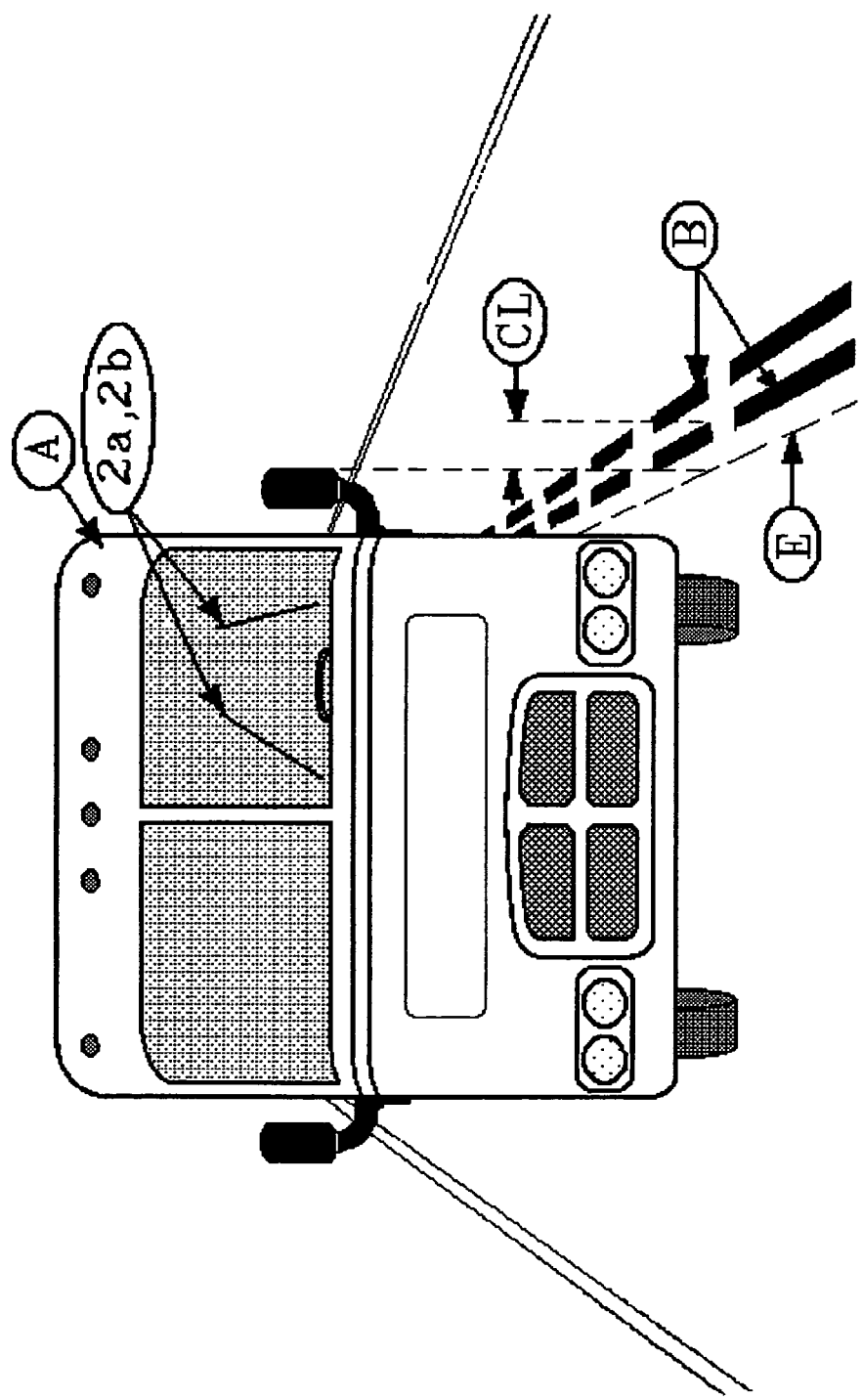
FIG. 3 is a front view of the subject vehicle positioned correctly to allow the setup procedure for the left-hand line on the windshield.
Figure 4:
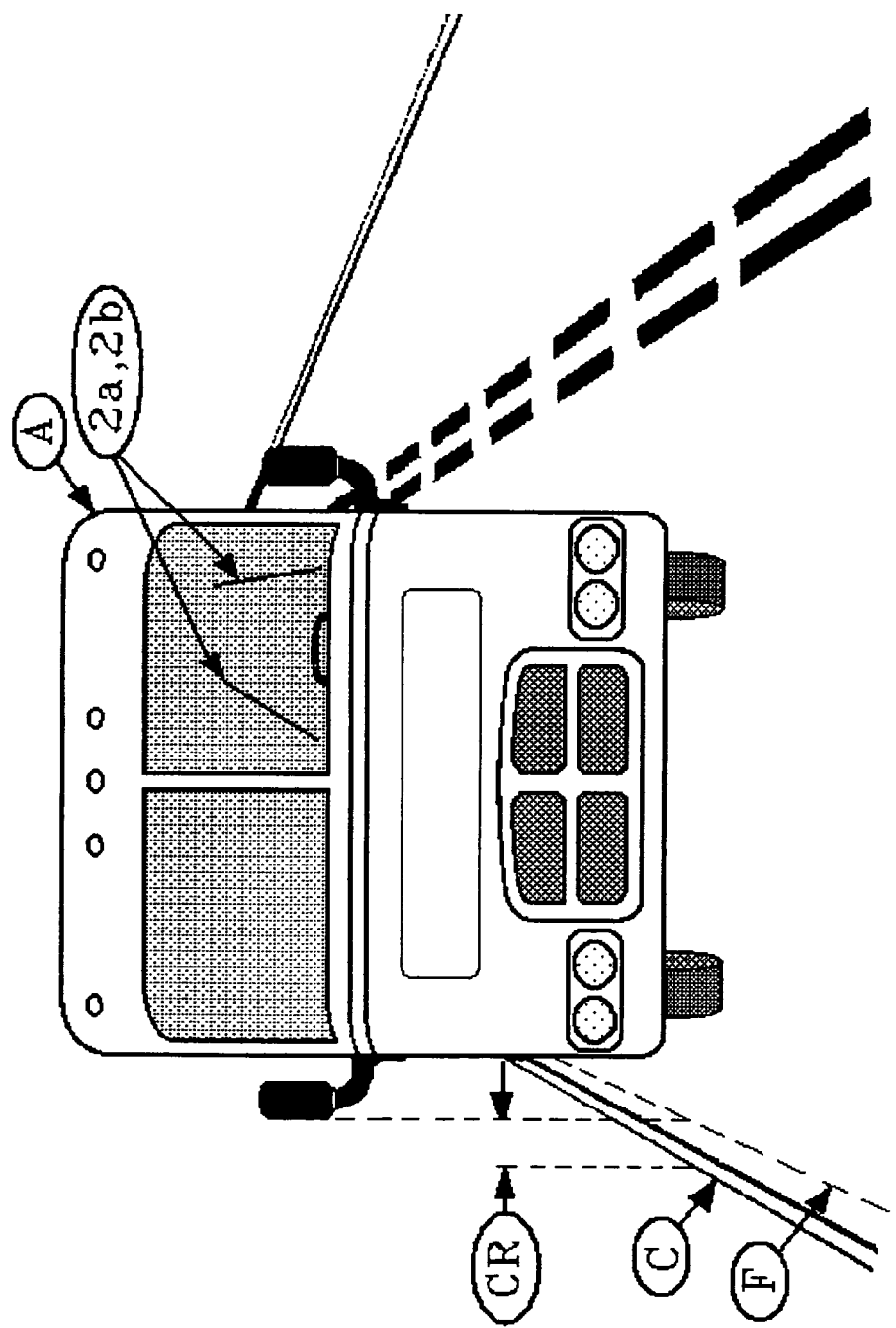
FIG. 4 is a front view showing the subject vehicle correctly positioned to allow the setup procedure for the right-hand line on the windshield.
Figure 6:
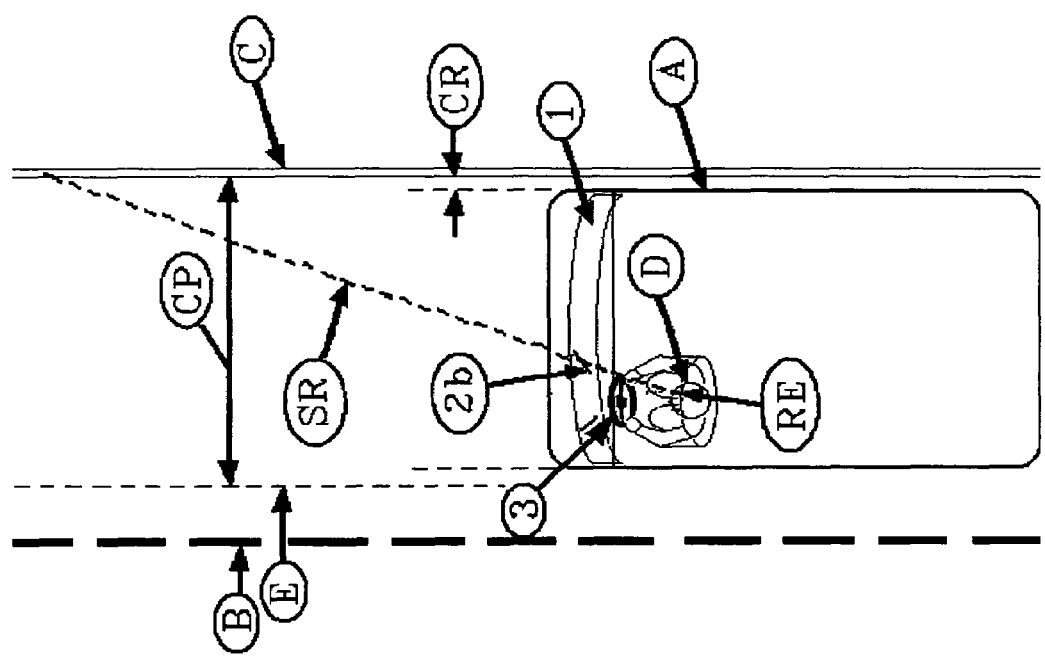
FIG. 6 is a view from above of the subject vehicle showing the driver in his or her normal driving position and with the subject vehicle positioned with the passenger side of the vehicle parallel to and a safe clearance from a line on the road surface to the right of the vehicle.
Figure 7:
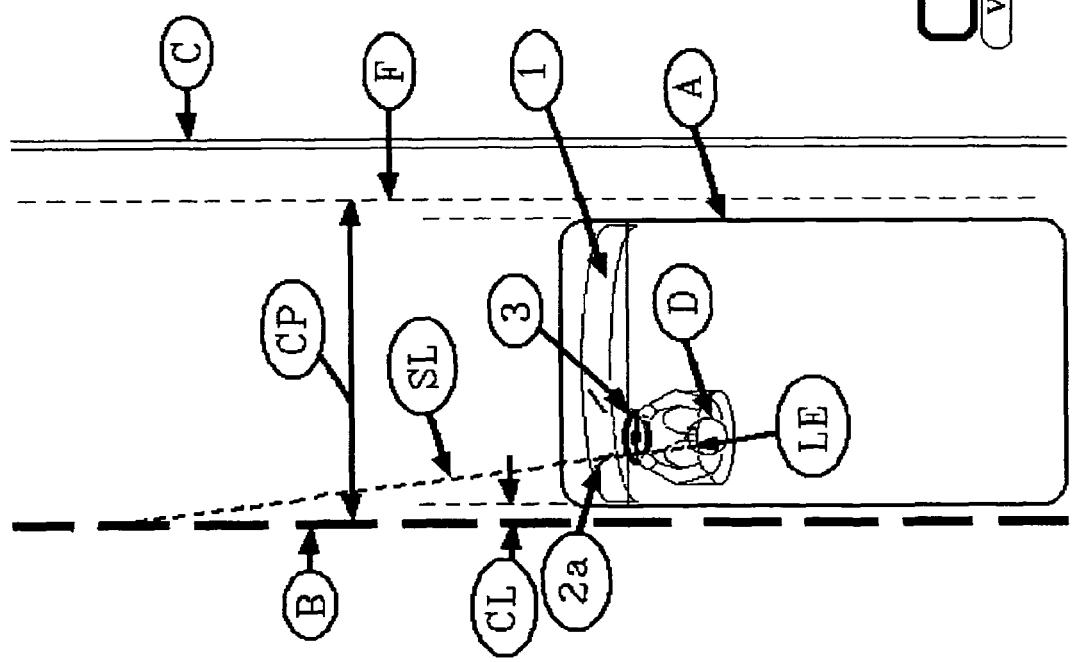
FIG. 7 is a view from above of the subject vehicle showing the driver in his or her normal driving position and with the subject vehicle positioned with the driver's side of the vehicle parallel to and a safe clearance from a left side lane line on the road surface to the left of the vehicle.

FIG. 1 shows a simple embodiment of the device portion of the present invention, a means of providing two driver-visible lines 2a and 2b in, on or near the windshield of vehicle which are oriented in an upwardly converging alignment as shown in FIGS. 1, 3 and 4. The exact location of these two lines would be such that a specific driver D in a specific vehicle A, FIG. 5, seated in his or her specific customary driving position, with the left eye LE only (right eye covered or closed), as shown in FIG. 7, would observe the left side lane line or center line B exactly overlaying a real or imagined left side safe clearance line E on the driving surface ahead as the vehicle travels straight ahead, and with the right eye RE only (left eye covered or closed), as shown in FIG. 6, would observe the right side line C (road edge or lane line) exactly overlaying a real or imagined right side safe clearance line F on the driving surface ahead as the vehicle travels straight ahead.

The present invention includes the method of setting up the position of the lines 2a and 2b in a particular vehicle A for a particular driver D in which the vehicle A is carefully placed in relation exactly parallel to a straight real lane line B on a flat driving surface such that the line represents a safe clearance distance CL from the left side of the vehicle as shown in FIG. 3 and FIG. 5. Means is then provided for the driver to establish the position of 2a, the left line of the two lines in, on or near the windshield 1, so that, as seen by the driver's left eye LE only, it appears to exactly overlay the real lane line B on the driving surface ahead as shown in FIG. 7. The method of setting up incorporated in the informational part of the present invention then teaches that the vehicle be positioned in the same relationship to a straight real lane line C on the driving surface on the right side of the vehicle A as shown in FIG. 4 and using the right eye RE only, position the right line 2b in, on or near the windshield 1 in similar manner to appear to overlay the right-hand real lane line C as shown in FIG. 6.

The informational part of the present invention also teaches the driver to keep his or her attention and eyes focused on the road ahead while driving forward as shown in FIG. 5. With the eyes focused on the road ahead, the driver-visible lines in, on or near the windshield will appear to the driver D as two pairs of lines 2a and 2b (inner and outer left and right line images) slightly out of focus as shown in FIG. 2.

The informational part of the present invention also teaches the driver to accept the area CP (clear path) of the road surface ahead that appears between the right or inner line of the left pair of lines 2a (as perceived by the driver) and the left or inner line of the right pair of lines 2b (as perceived by the driver) as the area that must remain clear of interference with the forward progress of the vehicle if no change of course is made. See FIG. 2. The informational part of the present invention also teaches the driver D to use these inner left and right line images of lines 2a and 2b to judge how close stationary objects will come to vehicle A if no change is made in the present course the vehicle is following.

The informational part of the present invention (not shown in the Figures) may be comprised of, but not limited to, written instructions and visual aids such as video, DVD or photographs. The informational part of the present invention also may be comprised of, but not limited to, verbal instruction and demonstration by technicians trained in the present invention and its use.

In its simplest embodiment, the device part of this invention involves the placement of either a driver-visible straight line 2a or 2b or straight line of marks (dashed lines or dots) directly on the windshield or a straight line or straight line of marks on a piece of transparent material as shown in FIG. 1, which is, in turn, applied to the windshield 1 to indicate to the driver D where each side of the vehicle will pass over the road ahead if it continues on a straight course. In practice, although not themselves lighted at night, these lines 2a and 2b show up against the area of the road ahead lighted by the headlights for night driving.

Figure 8:
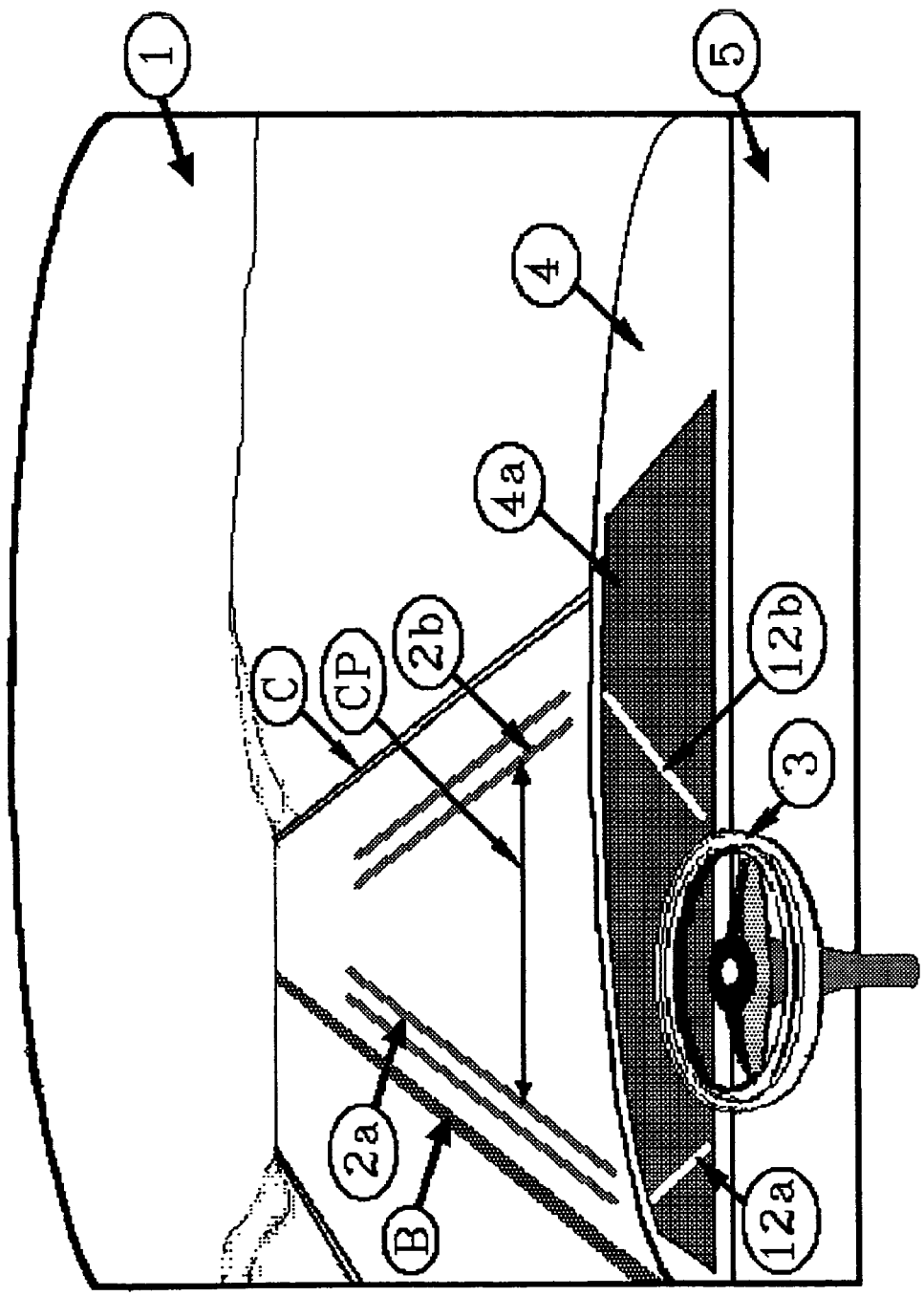
FIG. 8 is a driver's eye view through the windshield of a vehicle equipped with the present invention in the form of an LED array or a lighted liquid crystal panel mounted on the top of the dashboard. Not shown is a shield between the driver and the LED array or liquid crystal panel so placed as to prevent the driver from observing the liquid crystal panel or LED lights directly.

FIG. 8 shows still another embodiment of this invention which uses light sources such as an array of LEDs or a lighted liquid crystal panel 4a. Placed in the vicinity of the top 4 of the dashboard 5, these lights would reflect either solid driver-visible lines of light 12a and 12b or driver-visible interrupted lines of light (i.e. lines of "marks") off the inside of the windshield creating the effect of virtual left and right line images 2a and 2b on the windshield 1 to achieve the same result as the previous embodiment. A means would be provided (not shown in the figures) to hide the light sources 4a on or near the top 4 of the dashboard 5 from direct observation by the driver D when in the normal driving position D behind the wheel 3. This embodiment has the advantage over the previous embodiment of somewhat better night visibility.

Another form of this embodiment would employ an optical projection of a driver-visible image of two lines of light 2a and 2b or light line segments or lines of light marks onto the windshield 1. Another form of this embodiment would provide such visible lines of light images within the windshield 1 structure itself.

An additional improvement to this embodiment is a means (not shown in the Figures) by which the driver can adjust and change the position of the driver-visible lines 2a and 2b by remote control while sitting in his or her normal driving position and posture behind the steering wheel 3. Various state of the art electrical and/or electronic and/or mechanical means of facilitating remote control by the driver D can be employed to achieve this embodiment, particularly with the LED array or lighted liquid crystal panel 4a. The normal position of the driver's eyes ER and EL (FIGS. 5,6 and 7), relative to the vehicle A, is critical to the accuracy of the information about the relationship between the clearance path CP defined by the left and right line images 2a and 2b, and the actual left and right road markings or objects in the road. Therefore, this improvement constitutes an important addition to the invention since it permits the driver to position the lines as taught by the informational part of the invention while seated in a normal driving position and posture.

An additional improvement to the previous embodiment is a method of assigning definitive values to the parameters by which the subject driver-visible lines 2a and 2b or lines of marks are remotely located. By this means the correct positioning of said lines could be reestablished using the definitive values for a particular driver. This in turn will allow a number of different drivers of the same vehicle A equipped with the subject invention to reset the definitive values to suit their particular normal driving position and posture. The setting of the correct values for a particular driver could be done either manually or automatically. The automatic embodiment of this improvement of the invention could easily be adapted to the current state of the art automatic systems currently available in some vehicles. These systems set up a number of conditions desired by a particular driver as a result of the entry of a single code number driver identification into the vehicle control system (e.g. existing seat and mirror adjustments).

Figure 9:
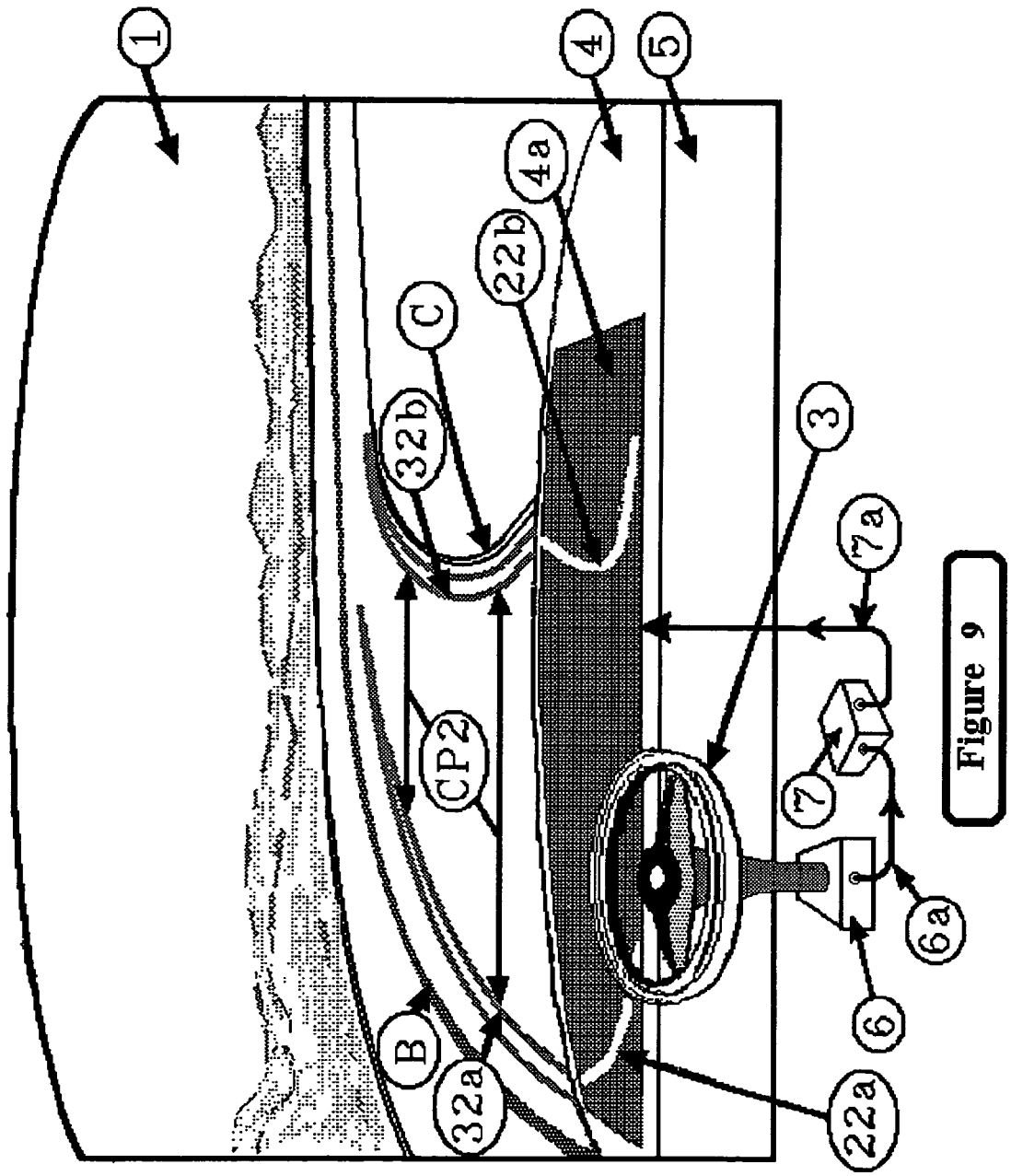
FIG. 9 is a similar driver's eye view through the windshield of a vehicle equipped with the present invention in the form of an LED array or a lighted liquid crystal panel mounted on the top of the dashboard. In this view the lines are curved in response to the position of the steering wheel. Not shown is a shield between the driver and the LED array or a liquid crystal panel.
Figure 10:
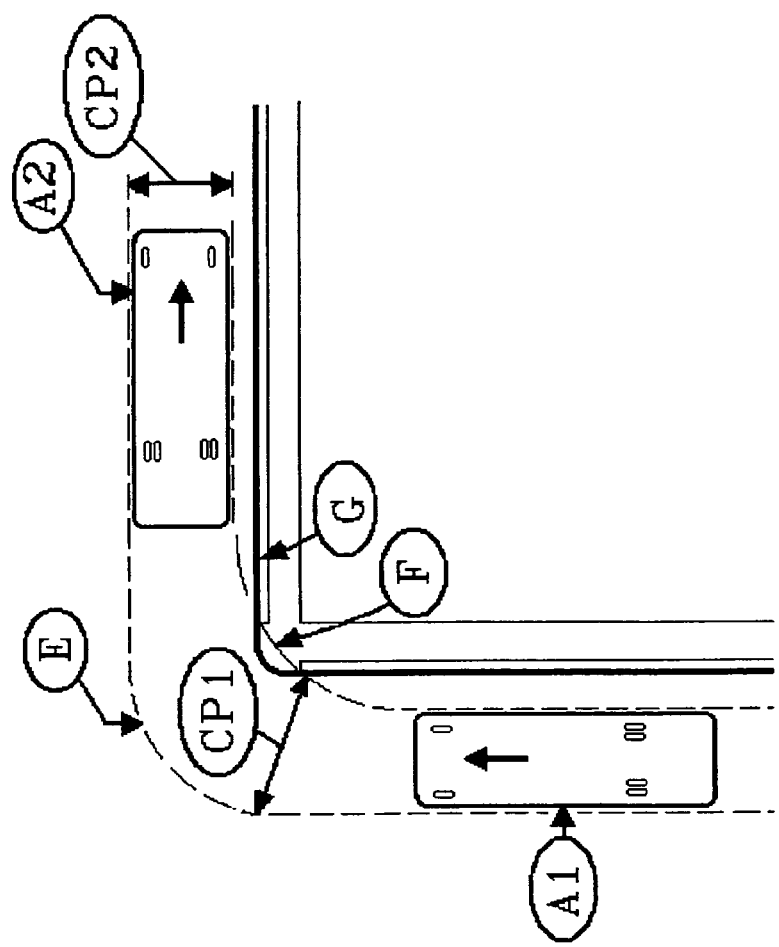
FIG. 10 is a view from above showing a large vehicle turning a corner. It illustrates the fact that the distance between the clearance lines is much greater in the middle of the turn than it is when the vehicle is moving straight forward. It also illustrates that the path of the rear end of the vehicle will go over the curb.
Figure 12:
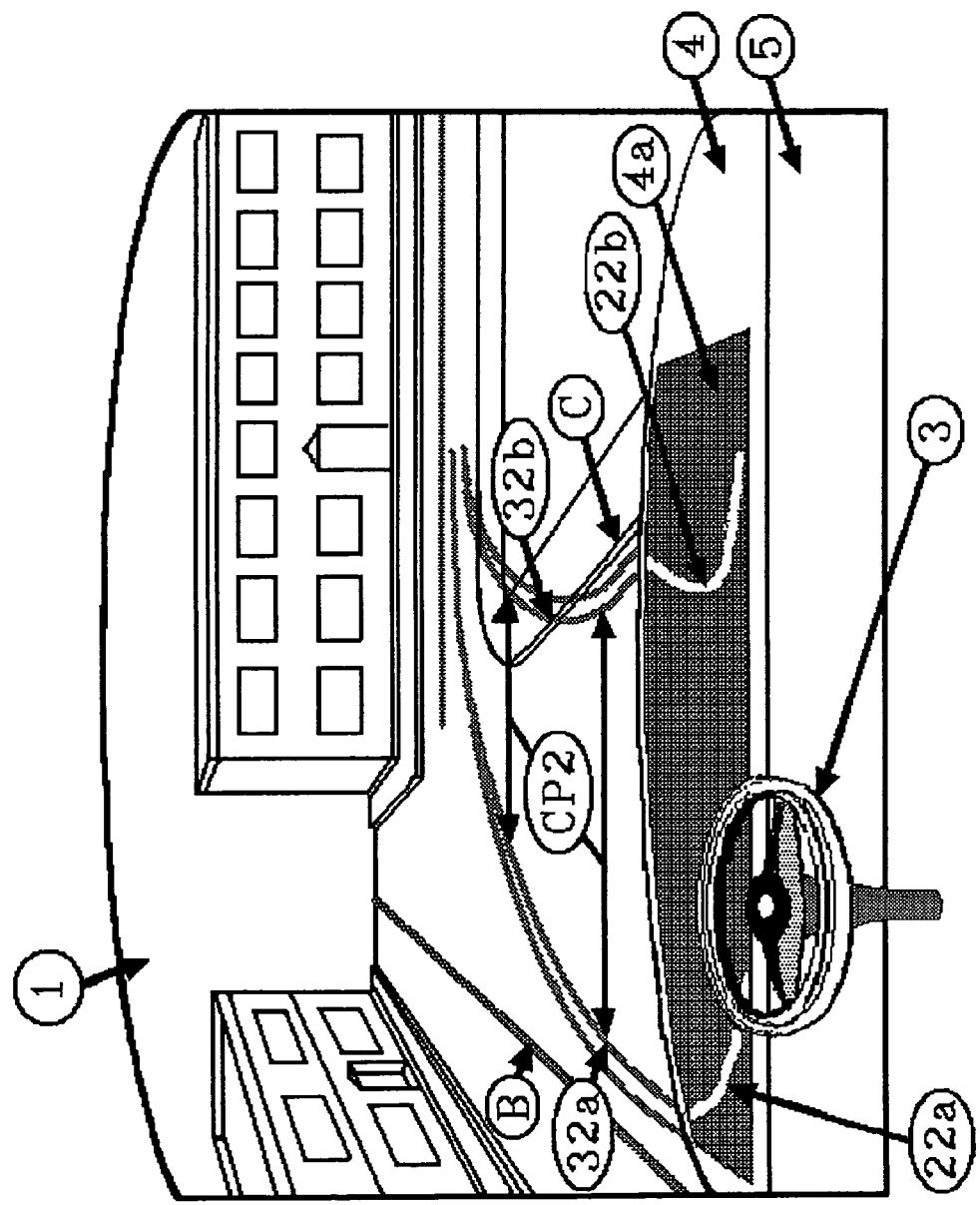
FIG. 12 is a driver's eye view through the windshield of a large vehicle equipped with the present invention turning a corner. As in FIG. 10 it illustrates that the path of the rear end of the vehicle will go over the curb.

FIG. 9, shows the driver's view through the windshield 1 of a large vehicle on a road curving to the right, shows another embodiment of this invention which will provide the driver with curved driver-visible left and right lines 32a and 32b, a curved series of lines or curved lines of marks for each side of the vehicle showing the driver the clearance path CP2 it will take if the current setting of the steering wheel 3 is held constant. Using the instantaneous steering wheel position information detected by the sensor 6 and transmitted by the cable 6a, the vehicle wheel base, steering ratio, vehicle speed and tire slippage, an on board computer 7 will calculate the instantaneous vehicle turning radius and transmit the information via cable 7a to the LED array or lighted liquid crystal panel 4a which will update the left and right line images seen by the driver as the steering wheel 3 setting changes. For large vehicles the extra clearance CP1 versus CP2 required by the different track taken by the back end of a long vehicle along the path A1–A2 can also be calculated and shown to the driver by the computer as shown in FIG. 10 and FIG. 12. This is a very important advantage of this embodiment of the present invention because it helps the driver D of subject vehicle A avoid hitting objects or curbs G that are on the inside of a turn.

Figure 11:
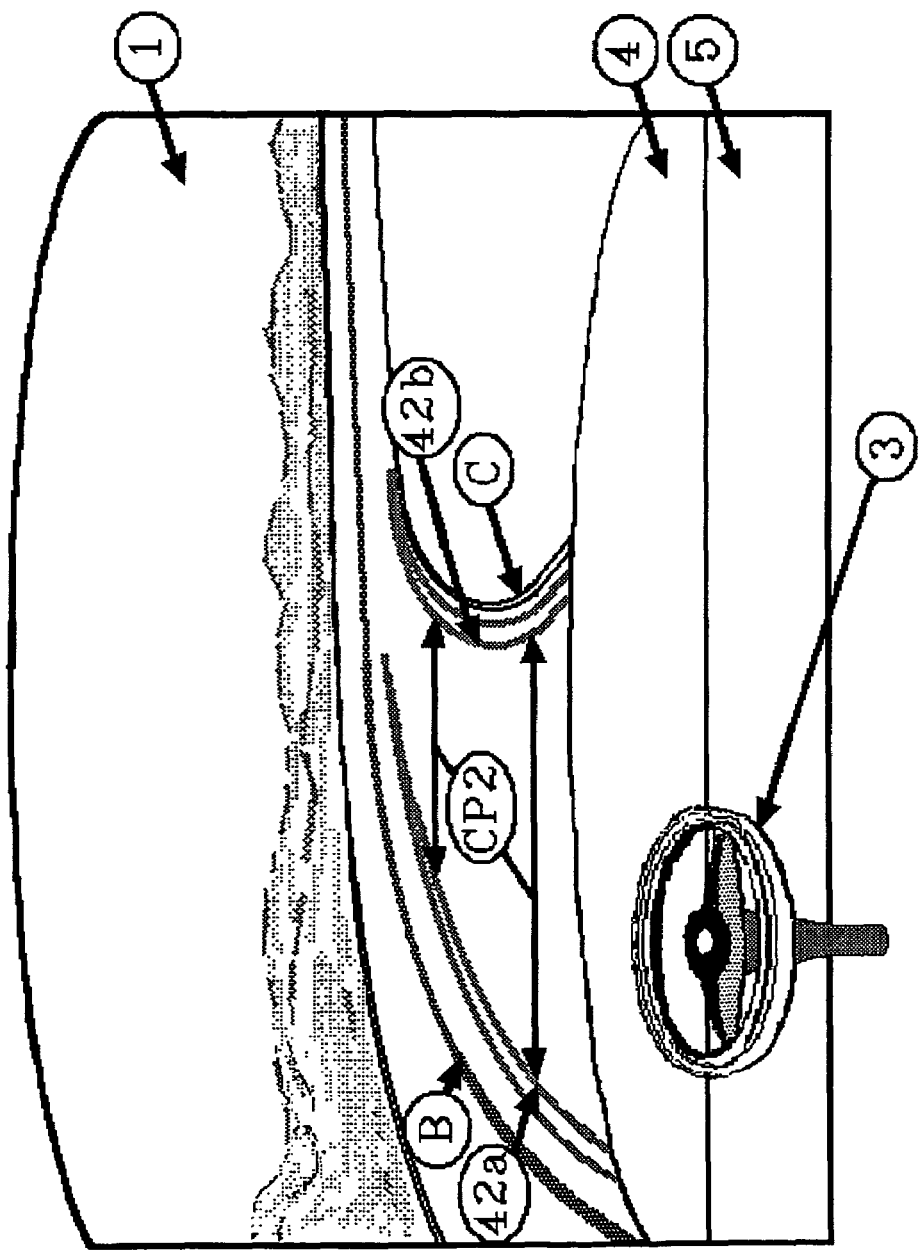
FIG. 11 is a driver's eye view through the windshield of a vehicle equipped with the present invention similar to FIG. 9. In this view the lines are generated directly in or on the windshield by existing or similar "heads up" technology.

FIG. 11 shows another form of this embodiment would provide such curved driver-visible left and right line images 42a and 42b of light within the windshield 1 structure itself.

FIG. 12 shows the driver's view through the windshield 1 of a large vehicle making a right turn as in FIG. 10 and illustrates how the clearance left and right line images 32a and 32b warn the driver that the curb C falls within the clearance path CP2 indicating that the rear wheels will go up over the curb if the vehicle continues forward with the steering wheel 3 at its present setting.

The LED or lighted liquid crystal panel, remote adjustment and automatic driver-selected settings are well within the skill of the artisan in electronics and computer programming. The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A method for driving a large motor vehicle having a windshield behind which a driver sits and operates a steering wheel of the vehicle, comprising:

placing a pair of driver-visible lines in, on or near the windshield, located for a particular driver relative to the driver's head position while driving the vehicle, the lines being obliquely positioned relative to horizontal and converging toward one another at upper ends of the lines, including a left line and a right line, the left line being oriented to appear to the driver to be generally parallel to a left side lane line in a roadway where the vehicle is being driven in a straight path and wherein the path ahead of the vehicle is straight, and the right line being oriented to appear to be generally parallel to a right side lane line or right edge of the roadway on which the vehicle is being driven on a straight path, driving the vehicle with the eyes of the driver focused and converged ahead at the roadway and not on the driver-visible lines, thereby producing in the peripheral vision of a two-eyed driver a double image of each of the left and right driver-visible lines, the double images comprising inner and outer left line images and inner and outer right line images and the inner left and right line images defining a conceptual zone of safety between them, and steering the vehicle so as to maintain the vehicle on a path wherein both the left side lane line and the right side lane line or roadway edge remain outside the zone of safety, whereby when such a line enters the zone of safety the driver takes this as a warning that corrective steering action is needed.

2. The method of claim 1, wherein the step of placing driver-visible lines comprises attaching adhesive-backed visible strips of flexible material directly onto the inside surface of the windshield.

3. The method of claim 1, wherein the step of placing driver-visible lines comprises forming light lines on or adjacent to a top surface of a dashboard of the vehicle, not directly visible to the user, and thereby reflecting the lines off the inside surface of the windshield toward the driver as reflected images of the light lines.

4. The method of claim 1, wherein the step of placing driver-visible lines includes locating the driver-visible lines in such a way that a selected minimum clearance distance of the vehicle from the left side lane line is maintained when the inner left line image appears to be parallel to and directly overlies the left side lane line, and such that a selected right side minimum clearance distance is maintained between the vehicle and the right side lane line or right edge of the roadway when the inner right line image appears to be parallel to and directly overlies the right side lane line or right edge of the roadway, thereby defining the conceptual zone of safety between the inner left and right line images when the driver's eyes are directed ahead at the roadway.

5. The method of claim 4, wherein for placement of the driver-visible lines the vehicle is placed near the left side lane line such that the vehicle is separated from the left side lane line by said selected minimum left side clearance, and including establishing the inner left line image to overlie the left side lane line with the vehicle in such position, then repeating this step with the vehicle near the right side lane line or right edge of the roadway, with the vehicle at the selected minimum right side clearance distance from the right side lane line or right edge of the roadway.

6. The method of claim 5, wherein the step of locating the driver-visible lines is performed by closing or covering the right eye to locate the inner left line image, and by closing or covering the left eye to locate the inner right line image.

7. The method of claim 4, wherein the step of locating the driver-visible lines is performed by closing or covering the right eye to locate the inner left line image, and by closing or covering the left eye to locate the inner right line image.

8. The method of claim 1, wherein the step of placing the driver-visible lines is performed by closing or covering the right eye to locate the inner left line image, and by closing or covering the left eye to locate the inner right line image.

9. A method for driving a large motor vehicle having a windshield behind which a driver sits and operates a steering wheel of the vehicle, comprising:

providing a light source near the vehicle windshield, in a position as not to be seen directly by the driver but such as to make a reflection of a pair of light lines within the vehicle and visible to the driver, the lines being straight or curved and converging toward one another at their upper ends as seen reflected, the reflected left and right lines being located for a particular driver relative to the driver's head position while driving the vehicle, the left line being oriented to appear to the driver to be generally parallel to a left side lane line in a roadway where the vehicle is being driven in a straight path and where the path ahead of the vehicle is straight, and the right line being oriented to be generally parallel to a right side lane line or right edge of the roadway on which the vehicle is being driven in a straight path, and including automatic means connected to the steering wheel of the vehicle and responsive to the rotational position of the steering wheel for adjusting the curvature of the left and right lines seen as reflections in accordance with the steering wheel position such that the left and right lines are straight when the vehicle is being driven in a straight path, and such that the left and right lines are curved and represent the path that will be taken, as seen against the roadway ahead, by the vehicle if the driver proceeds ahead with the steering wheel continuing in the same position, and driving the vehicle with the eyes of the driver focused and converged ahead at the roadway and not on the reflected lines seen, thereby producing in the peripheral vision of a two-eyed driver a double image of each of the left and right reflected lines, the double images comprising inner and outer left line images and inner and outer right line images and the inner left and right line images defining a conceptual zone of safety between them, and steering the vehicle so as to maintain the vehicle on a path wherein both the left side lane line and the right side lane line or roadway edge remain outside the zone of safety, including when traveling through turns or curves, whereby when such a lane line enters the zone of safety, as seen by the driver, the driver takes this as a warning that corrective steering action is needed.

10. The method of claim 9, wherein the light source comprises an LED array, and including a remote control device with means, enabling the driver to set the apparent positions of the left and right driver-visible lines as reflected while the driver is in a normal driving position.

11. The method of claim 10, including the driver's setting the apparent positions of the inner left and right images by closing or covering the right eye to set the inner left image relative to the left side lane lines and closing or covering the left eye to set the inner right image relative to the right side lane or roadway edge.

12. The method of claim 9, including the driver's setting the apparent positions of the inner left and right images by closing or covering the right eye to set the inner left image relative to the left side lane lines and closing or covering the left eye to set the inner right image relative to the right side lane or roadway edge.

13. A system assisting a driver of a large motor vehicle having a windshield behind which the driver sits and operates a steering wheel of the vehicle, the system comprising:

a light source near the vehicle windshield, in a position as not to be seen directly by the driver but such as to make a reflection of a pair of light lines within the vehicle and visible to the driver, the lines being straight or curved and adjustable and converging toward one another at their upper ends as seen reflected, the reflected left and right lines being located for a particular driver relative to the driver's head position while driving the vehicle, the left line being oriented to appear to the driver to be generally parallel to a left side lane line in a roadway where the vehicle is being driven in a straight path and where the path ahead of the vehicle is straight, and the right line being oriented to appear to be generally parallel to a right side lane line or right edge of the roadway on which the vehicle is being driven in a straight path, and automatic means connected to the steering wheel of the vehicle and responsive to the rotational position of the steering wheel for adjusting the curvature of the left and right reflected lines in accordance with the steering wheel position such that the left and right lines are straight when the vehicle is being driven in a straight path, and such that the left and right lines are curved and represent the path that will be taken, as seen against the roadway ahead, by the vehicle if the driver proceeds ahead with the steering wheel continuing in the same position, whereby the driver drives the vehicle with the eyes of the driver focused and converged ahead at the roadway and not on the reflected lines, thereby producing in the peripheral vision of a two-eyed driver a double image of each of the left and right reflected lines, the double images comprising inner and outer left line images and inner and outer right line images and the inner left and right line images defining a conceptual zone of safety between them, and with the driver steering the vehicle so as to maintain the vehicle on a path wherein both the left side lane line and the right side lane line or roadway edge remain outside the zone of safety, including when traveling through turns or curves, whereby when such a lane line enters the zone of safety, as seen by the driver, the driver takes this as a warning that corrective steering action is needed.

14. The system of claim 13 wherein the light source comprises an LED array.

15. The system of claim 13, wherein the light source comprises a lighted liquid crystal panel.

16. The system of claim 13, further including a remote control device allowing the driver to set the apparent positions of the left and right driver-visible reflected lines while the driver is in a normal driving position, by adjusting the light source.

17. The system of claim 13, wherein the vehicle has a dashboard with an upper surface, and wherein the light source is mounted on the upper surface of the dashboard in such a way as not to be directly visible to the driver.

18. The system of claim 13, wherein the automatic means connected to the steering wheel includes a microprocessor receiving inputs regarding steering wheel position and controlling the orientation and shape of the light source in accordance with such inputs.

19. The system of claim 18, wherein the light source comprises an LED array connected to the microprocessor.

20. The system of claim 18, wherein the light source comprises a lighted liquid crystal panel.

21. A system assisting a driver of a large motor vehicle having a windshield behind which the driver sits and operates a steering wheel of the vehicle, the system comprising:

a light source near the vehicle windshield, in a position as not to be seen directly by the driver but such as to make a reflection within the vehicle of a pair of driver-visible light lines, the lines being adjustable and converging toward one another at their upper ends as seen reflected, the reflected left and right lines being located for a particular driver relative to the driver's head position while driving the vehicle, the left line being oriented to appear to the driver to be generally parallel to a left side lane line in a roadway where the vehicle is being driven in a straight path and where the path ahead of the vehicle is straight, and the right line being oriented to appear to be generally parallel to a right side lane line or right edge of the roadway on which the vehicle is being driven in a straight path, and a separate remote control device allowing the driver to set the apparent positions of the left and right driver-visible lines as reflected while the driver is in a normal driving position, by adjusting the light source, whereby the driver drives the vehicle with the eyes of the driver focused and converged ahead at the roadway and not on the reflected lines, thereby producing in the peripheral vision of a two-eyed driver a double image of each of the left and right reflected lines, the double images comprising inner and outer left line images and inner and outer right line images and the inner left and right line images defining a conceptual zone of safety between them, and with the driver steering the vehicle so as to maintain the vehicle on a path wherein both the left side lane line and the right side lane line or roadway edge remain outside the zone of safety, whereby when such a lane line enters the zone of safety, as seen by the driver, the driver takes this as a warning that corrective steering action is needed.

22. The system of claim 21, wherein the driver-visible light lines are seen by the driver as reflections on the windshield of the vehicle.

* * * * *